United States Patent [19]

Somura

[11] Patent Number: 5,035,911
[45] Date of Patent: Jul. 30, 1991

[54] PROCESS OF PRODUCING LIQUOR-INCLUDED ICE

[76] Inventor: Katsuzo Somura, 4-4, Chuo 5-chome, Nakano-ku, Tokyo, Japan

[21] Appl. No.: 636,736

[22] Filed: Feb. 11, 1991

Related U.S. Application Data

[62] Division of Ser. No. 484,418, Feb. 26, 1990, Pat. No. 5,013,562.

[30] Foreign Application Priority Data

Oct. 6, 1989 [JP] Japan .................................. 1-261668

[51] Int. Cl.⁵ .............................................. A23P 1/00
[52] U.S. Cl. ......................................... 426/515; 62/1; 426/592
[58] Field of Search ................. 426/515, 592, 524, 66, 426/89, 100; 62/1, 66

[56] References Cited

U.S. PATENT DOCUMENTS 4,229,482 10/1980 Kreske .................................. 426/592
4,550,575 11/1985 DeGaynor .............................. 62/1

Primary Examiner—George Yeung
Attorney, Agent, or Firm—Fidelman & Wolffe

[57] ABSTRACT

The liquor-included ice according to the present invention is produced so that certain amount of water is filled in a glass-like container first, then an opening of the container is closed with a heat proof lid, through a center hole of which a nozzle is placed. In an icehouse, air is blown in the container through the nozzle until transparent ice is produced around lower and side portions of the container, then the remaining water in the container is drained, any type of liquor is filled in a concavity where the remaining water was, and an ice plate is placed on top of the ice lump sealing the liquor in the concavity. The ice plate is arranged so that it is easily broken by an outer force.

4 Claims, 3 Drawing Sheets

PROCESS OF PRODUCING LIQUOR-INCLUDED ICE

This application is a divisional of Ser. No. 484,418, filed Feb. 26, 1990, now U.S. Pat. No. 5,013,562.

BACKGROUND OF THE INVENTION

The present invention relates to an liquor-included body of ice and the process of producing the same. It is necessary to prepare some ice and mineral water, besides liquor, when making a glass of liquor with water or on the rocks.

However, for example, when one wants to enjoy a couple of glasses of whisky with water, he has to carry with him such as a miniature bottle of whisky, tasty transparent ice lump, mineral water and a glass. All of them could be prepared at once by a drink service in such as a train, but they can not easily be prepared at once in town.

It is not easy to make one or two glasses of favorite liquor with tasty water or rocks in town especially while traveling. A lot of liquor, water or ice have to be wasted if one buys a regular bottle of liquor, mineral water, pure ice and a glass to make only one or two drinks.

The object of the present invention, therefore, is to provide a ice enclosed liquor and the process of the same, with which one can easily make a good tasting of a glass of liquor with water or rocks anywhere in town or while traveling.

DETAILED DESCRIPTION OF THE INVENTION

To accomplish the object of the present invention, liquor such as whisky or bandy is filled in a concavity of a transparent ice lump in a glass-like container, and an ice plate is positioned on top of the ice lump to seal the liquor in the ice lump. The ice plate is arranged to break easily by an outer force.

According to the process of producing the liquor included ice body, first, a certain amount of water is filled in a glass-like container, then the container is covered with a heat proof lid, a nozzle is placed through a center hole thereof, and air is blown to the liquor through the nozzle while the water in the container is freezing in an ice house. The freezing is continued until lower and side portions of the container are iced. Any water still remaining is drained, and liquor is filled in the concavity where the water remained. An ice plate, which is easily broken by an outer force, is placed on top of the ice lump with some water which will be frozen to seal the liquor in the concavity. The sealing is completed as the water freezes between the ice lump and the ice plate.

Making the glass-like container transparent, the liquor is observed through the transparent ice lump, which could promote one's appetite.

By pressing on a removable cap of the container, the ice plate easily breaks and drops into the liquor. After removing the cap, one can enjoy the liquor on the rocks or even with water by adding some water or as the ice lump dissolves in the liquor.

By providing a freezer (or even dry ice) that prevents the ice lump from melting, the liquor included ice according to the present invention can be available from a vending machine or anywhere in a town and in a train, like a can or a bottle of juice, so that one can easily enjoy his favorite liquor with tasty ice without carrying or buying a glass.

According to the process of producing the liquor included ice, tasty ice lump having a concave thereon and containing neither air nor impurities therein can be easily produced.

Further, according to the present invention, an ice plate easily sticks on top of the ice lump with an assist of some water, so that sealing the liquor in the ice lump can be done easily quickly and safely.

PREFERRED EMBODIMENT OF THE INVENTION

Figure 1:
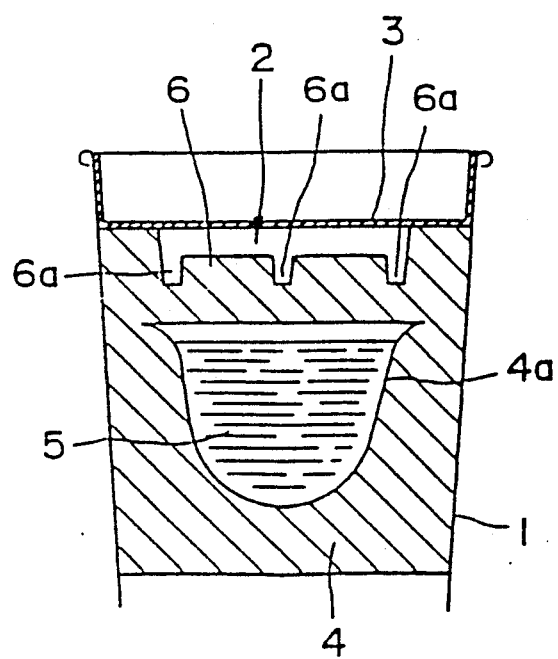
FIG. 1 shows a sectional view of a liquor included ice body according to the present invention.

Referring to FIG. 1 which shows a preferred embodiment of the present invention, a glass-like container 1 can be made of glass or plastic, and it is made transparent so that one can see inside thereof.

The size of the glass-like container can be arranged considerably bigger than the actual size of the liquor included ice 2 in the container 1, so that a capacity for some water that weakens the liquor is provided.

In this preferred embodiment of the invention, the center portion of a cap 3 extends into the container sufficiently to hold the liquor included ice still, and to contain some snacks in an open space available on the cap 3.

In the liquor included ice body 2 according to the present invention, pure water becomes a transparent ice lump 4 before impure water freezes because of the difference of the specific heat, and a concavity 4a remains after the impure water is drained from the container 1, some liquor 5 such as whisky or brandy is filled in the concave 4a and the concavity 4a closed by an ice plate 6. Since the transparent ice lump 4 is made from pure water, it melts in the liquor 5 and becomes tasty water.

By adjusting an amount of the liquor 5 filled in the concave 4a, the liquor with water or rocks can be arranged stronger or weaker. As shown in FIG. 1, a number of slits 6a are cut on the ice plate 6, so that the ice plate 6 can easily break by an outer force. In the liquor included ice body 2 according to the present invention, every necessary thing is included in a single container 1, so that it is easy to handle for a supplier and it is easy to buy and drink for a comsumer. Further, the liquor included ice body 2 can be kept in a simple ice box (or even dry ice) sufficient for keeping the ice frozen, so that it is easy to sell at any store and to purchase even from a vending machine.

The process of producing the liquor included ice according to the present invention is explained below referring to FIGS. 2A-2H.

Figure 2A:
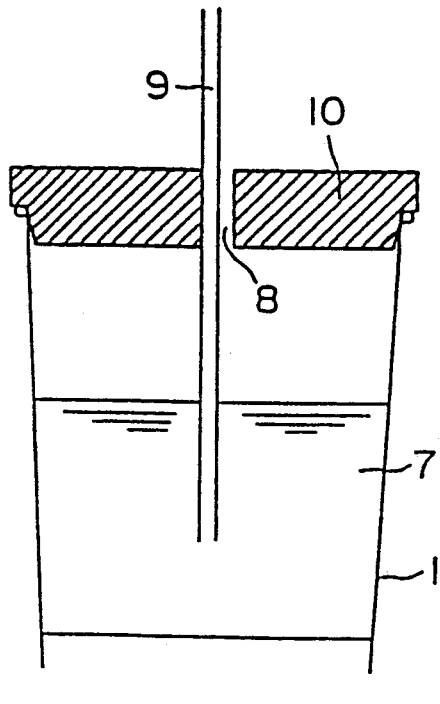
FIGS. 2A-2H shows a process of producing the liquor included ice body according to the present invention.

First, a certain amount of water 7 is filled in a glass-like container 1, and a heat-proof lid 10 is placed to cover the container 1. A nozzle 9 is placed through a center hole 8 of the lid 10. The heat-proof lid 10 is effective to delay an upper portion of the water from freezing. (FIG. 2A)

Figure 2B:
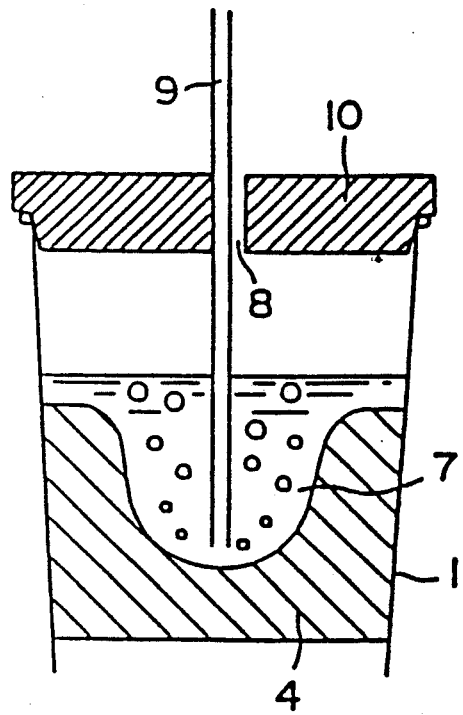
Figure 2C:
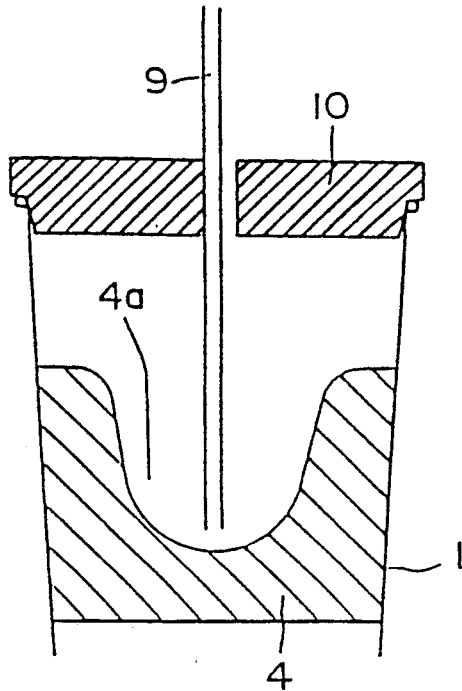

Then the air is blown through the nozzle 9 to the water while the water continues to freeze. The temperature of an ice house should be set preferably between $-5°$ C. to $-10°$ C. Water needs to be stirred or otherwise agitated while freezing in order to make ice that contains no bubbles. According to the present invention, the water is agitated by air instead of stirring. Since the water is agitated by blown air, pure water freezes at lower and side portions of the container 1, making a transparent ice lump 4. When about 60% of the water freezes and when the freezing procedure is terminated, the remained 40% of the water should containes impurities and is left unfrozen. (FIG. 2B)

The remaining water is drained through the nozzle 9. (FIG. 2B)

Figure 2D:
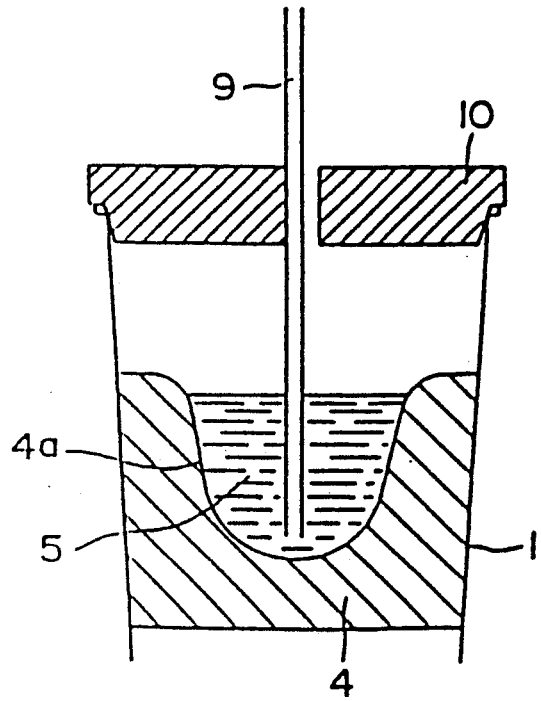

Any liquor 5 such as whisky and brandy is filled through the nozzle 9 into a cancavity 4a left by the unfrozen water. (FIG. 2D)

Figure 2E:
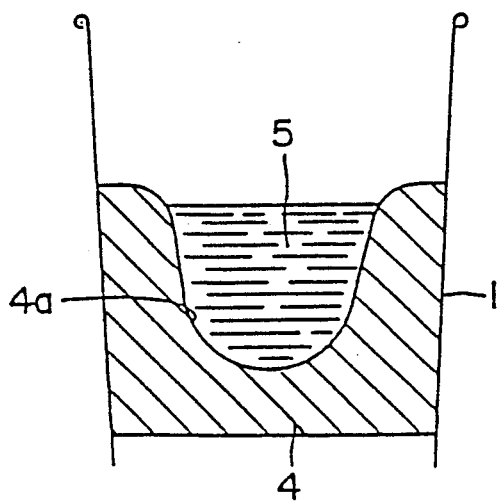

The heet-proof lid 10 and the nozzle 9 are removed from the container 1. (FIG. 2E)

Figure 2F:
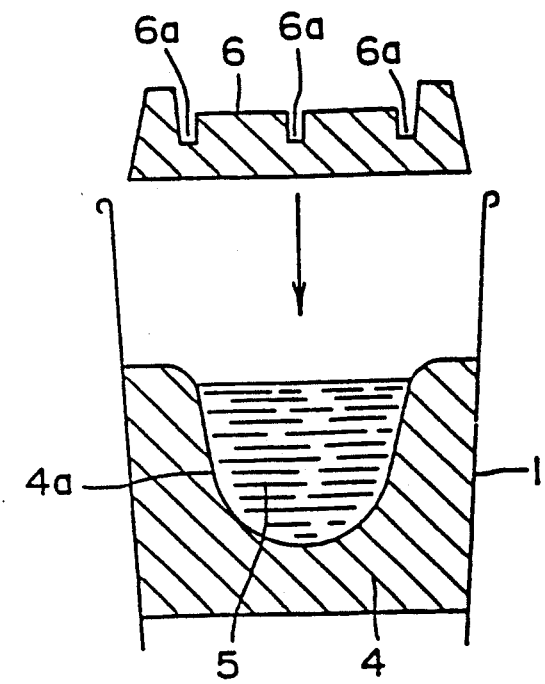

An ice plate 6, having a number of slits 6a cut therein for easy breakage, is placed on top of the transparent ice lump 4. (FIG. 2F)

Figure 2G:
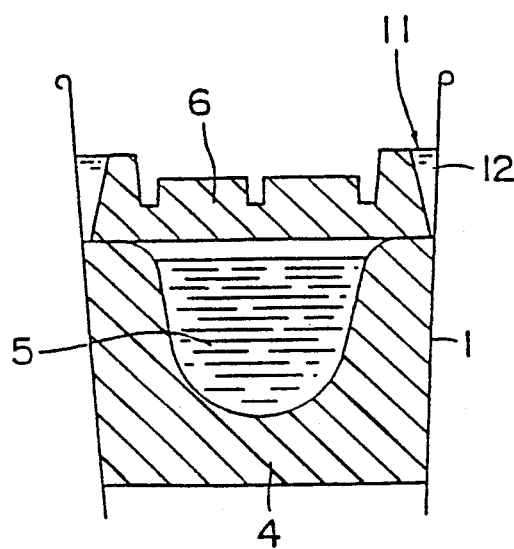

Some water 12 is filled in a gap 11 between the ice plate 6 and the container 1, so that as the water 12 freezes, the liquor 5 is sealed at once in the concave 4a. (FIG. 2G)

Figure 2H:
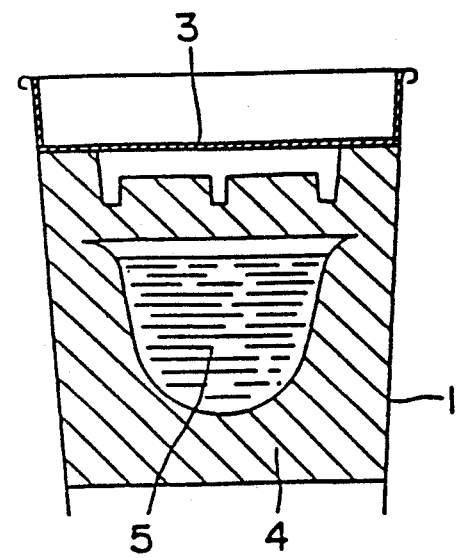

A cap 3 is placed on top of the container 1, completing the packing of the iced drink. (FIG. 2H)

The considerable effects of the present invention are as follows.

According to the present invention, various kinds of liquor with tasty water or rocks can be easily supplied to consumers like a can or bottle of juice.

According to the present invention, a liquor included ice can be made easily and efficiently, since, for example, a concave is formed without any difficulties and an ice body plate sticks to the transparent ice lump easily.

What we claim is:

1. A process for producing a liquor included ice comprising:
    filling a predetermined amount of water in a glass-like container;
    covering said container with a heat-proof lid, said lid having a center hole therethrough and a nozzle placed through said center hole;
    blowing air into said water through said nozzle to freeze water at lower and side portions of said container and form a concavity of ice;
    draining unfrozen water from said concavity;
    filling a predetermined amount of a liquor in said concavity; and
    placing an ice plate to seal said liquor in ice, said ice plate being breakable by an external force.

2. The process of claim 1, wherein said ice plate is frozen to said concavity of ice to seal said liquor in ice.

3. The process of claim 1, wherein said ice plate contains slits for assisting in breaking said ice plate by an external force.

4. The process of claim 1, further comprising agitating said water as it is blown.

* * * * *